(12) United States Patent
Gordon et al.

(10) Patent No.: US 11,919,111 B1
(45) Date of Patent: Mar. 5, 2024

(54) METHOD FOR REPAIRING DEFECTS IN METAL STRUCTURES

(71) Applicants: Brian L. Gordon, Wheeling, WV (US); Brandon J. Coates, Shadyside, OH (US)

(72) Inventors: Brian L. Gordon, Wheeling, WV (US); Brandon J. Coates, Shadyside, OH (US)

(73) Assignee: Touchstone Research Laboratory Ltd., Triadelphia, WV (US)

( * ) Notice: Subject to any disclaimer, the term of this patent is extended or adjusted under 35 U.S.C. 154(b) by 582 days.

(21) Appl. No.: 16/743,974

(22) Filed: Jan. 15, 2020

(51) Int. Cl.
*B23P 6/04* (2006.01)
*B63B 81/00* (2020.01)

(52) U.S. Cl.
CPC ............... *B23P 6/04* (2013.01); *B63B 81/00* (2020.01); *B63B 2221/10* (2013.01); *B63B 2231/52* (2013.01)

(58) Field of Classification Search
CPC ....... B23P 6/04; B63B 81/00; B63B 2221/10; B63B 2231/52
See application file for complete search history.

(56) References Cited

U.S. PATENT DOCUMENTS

| | | | |
|---|---|---|---|
| 3,103,722 A | 9/1963 | Whitehurst et al. | |
| 3,795,042 A | 3/1974 | Kreider et al. | |
| 3,850,718 A * | 11/1974 | Trapani | C09J 7/26 428/63 |
| 3,993,818 A | 11/1976 | Novak et al. | |
| 4,082,864 A | 4/1978 | Kendall et al. | |
| 4,161,056 A * | 7/1979 | Dunham | B23P 6/00 416/213 A |
| 4,285,749 A | 8/1981 | Stiles | |
| 4,411,380 A | 10/1983 | Mcwithey et al. | |
| 4,482,912 A | 11/1984 | Chiba et al. | |
| 4,528,230 A * | 7/1985 | Larson | B23P 6/04 428/137 |
| 4,591,511 A * | 5/1986 | Peebles, Jr. | C09J 5/02 427/388.1 |
| 4,649,060 A | 3/1987 | Ishikawa et al. | |
| 4,659,593 A | 4/1987 | Rocher et al. | |
| 4,716,067 A | 12/1987 | Moji et al. | |
| 4,728,387 A | 3/1988 | Hilakos | |
| 4,752,537 A | 6/1988 | Bhagwan | |
| 4,779,563 A | 10/1988 | Ishikawa et al. | |
| 4,816,347 A | 3/1989 | Rosenthal et al. | |
| 4,820,355 A | 4/1989 | Bampton | |
| 4,886,202 A | 12/1989 | Ammon | |
| 4,891,408 A | 1/1990 | Newman-Evans | |
| 4,935,291 A | 6/1990 | Gunnink | |
| 4,948,406 A | 8/1990 | Kornmann | |

(Continued)

FOREIGN PATENT DOCUMENTS

| | | | |
|---|---|---|---|
| CA | 2255451 A1 | 6/2000 | |
| EP | 0436807 A1 | 7/1991 | |

(Continued)

*Primary Examiner* — Ryan J. Walters
(74) *Attorney, Agent, or Firm* — Philip Lane

(57) ABSTRACT

A method for repairing a crack in ships or other structures that includes adhesively applying fiber reinforced metal matrix composite tape across the crack of the structure to reduce propagation of the crack and provide additional structural stability until the crack can be permanently repaired.

3 Claims, 2 Drawing Sheets

(56) References Cited

U.S. PATENT DOCUMENTS

| | | |
|---|---|---|
| 5,049,419 A | 9/1991 | Kyono et al. |
| 5,289,966 A | 3/1994 | Izumi et al. |
| 5,407,727 A | 4/1995 | Newell |
| 5,424,105 A * | 6/1995 | Stewart ............... B64F 5/40 244/119 |
| 5,433,511 A | 7/1995 | Wei |
| 5,435,226 A | 7/1995 | Mcquilkin |
| 5,439,627 A | 8/1995 | De Jager |
| 5,523,169 A * | 6/1996 | Rafferty ............... B32B 37/00 29/402.09 |
| 5,540,797 A | 7/1996 | Wilson |
| 5,736,199 A | 4/1998 | Blucher |
| 5,886,313 A | 3/1999 | Krause et al. |
| 5,968,671 A | 10/1999 | Joseph |
| 6,004,683 A * | 12/1999 | Rafferty ............... B23P 6/005 29/402.09 |
| 6,046,426 A | 4/2000 | Jeantette et al. |
| 6,131,285 A | 10/2000 | Durand |
| 6,245,425 B1 | 6/2001 | Mccullough et al. |
| 6,329,056 B1 | 12/2001 | Deve et al. |
| 6,344,270 B1 | 2/2002 | Mccullough et al. |
| 6,455,804 B1 | 9/2002 | Gordon et al. |
| 6,460,597 B1 | 10/2002 | Mccullough et al. |
| 6,485,796 B1 | 11/2002 | Carpenter et al. |
| 6,524,658 B2 | 2/2003 | Murofushi et al. |
| 6,592,979 B1 | 7/2003 | Deteresa et al. |
| 6,629,557 B2 | 10/2003 | Blucher et al. |
| 6,630,093 B1 | 10/2003 | Jones |
| 6,655,633 B1 | 12/2003 | Chapman, Jr. |
| 6,660,088 B2 | 12/2003 | Negishi et al. |
| 7,164,096 B1 | 1/2007 | Gordon et al. |
| 7,170,028 B1 * | 1/2007 | Gordon ............... B23K 35/262 219/121.6 |
| 7,186,948 B1 | 3/2007 | Gordon et al. |
| 7,338,703 B2 | 3/2008 | Merriman |
| 7,498,077 B2 | 3/2009 | Joseph et al. |
| 7,591,299 B1 | 9/2009 | Gordon et al. |
| 7,681,625 B2 | 3/2010 | Gordon et al. |
| 7,774,912 B2 | 8/2010 | Gordon et al. |
| 9,492,975 B2 * | 11/2016 | Dan-Jumbo ............... B64F 5/40 |
| 2002/0125983 A1 | 9/2002 | Hwang et al. |
| 2002/0182397 A1 | 12/2002 | Whatley |
| 2003/0129437 A1 | 7/2003 | Kawaguchi et al. |
| 2003/0173460 A1 | 9/2003 | Cullen et al. |
| 2004/0131835 A1 | 7/2004 | Schmitt et al. |
| 2004/0190733 A1 | 9/2004 | Nayar et al. |
| 2005/0133123 A1 | 6/2005 | Joseph et al. |
| 2006/0060325 A1 | 3/2006 | Gordon et al. |
| 2006/0254744 A1 | 11/2006 | Gordon et al. |

FOREIGN PATENT DOCUMENTS

| | | |
|---|---|---|
| EP | 0765946 A1 | 4/1997 |
| EP | 1143028 A1 | 10/2001 |
| GB | 2222793 A | 3/1990 |
| JP | H11323458 A | 11/1999 |
| WO | 9215453 A1 | 9/1992 |

* cited by examiner

METHOD FOR REPAIRING DEFECTS IN METAL STRUCTURES

STATEMENT OF FEDERALLY SPONSORED RESEARCH

This invention was made with Government support under U.S. Navy contract numbers N0001416P2072 and N6833518C0062. The Government has certain rights in the invention.

FIELD OF THE INVENTION

The present invention is directed to a method for repairing cracks and other similar defects in metal structures.

BACKGROUND OF THE INVENTION

Aluminum alloys have revolutionized the design of vehicle, aircraft and ship structures. Replacing steel structures with aluminum has resulted in considerable weight reduction that, in turn, has resulted in millions of dollars of cost savings and tremendous performance advances. In practical terms, these weight reductions translate into fuel savings, additional cargo carrying capacity, and increased speed. However, aluminum suffers from various forms of corrosion, especially when subjected to sea water. Corrosion of aluminum components has a significant effect on system performance and total ownership costs. As the structure ages, cracking from corrosion in stressed components becomes a major issue. Permanent repairs of cracked components are expensive and not practical when the vehicle is deployed or otherwise in service. Current temporary repair methods are effective at sealing the cracked area, but do not prevent further crack growth, which could lead to more costly repairs.

SUMMARY OF THE INVENTION

The present invention is directed to temporary and/or permanent repair solutions for cracks or other similar defects in a metal structure, such as an aluminum structure, that arrests or retards crack growth. In certain embodiments, the method includes covering at least 25% of the defect with at least one layer of fiber reinforced metal matrix composite tape and adhesively bonding the at least one layer of fiber reinforced metal matrix composite tape to the metal structure. In some embodiments, the fiber reinforced metal matrix composite tape is oriented such that the fibers in the fiber reinforced metal matrix composite tape are oriented across the length of the defect. In additional embodiments, the method may include a second layer of fiber reinforced metal matrix composite tape oriented at an angle relative to the at least one layer of fiber reinforced metal matrix composite tape. In some embodiments, the second layer of fiber reinforced metal matrix composite tape is substantially orthogonal to the at least one layer of fiber reinforced metal matrix composite tape.

DETAILED DESCRIPTION OF EMBODIMENTS OF THE INVENTION

Some preferred embodiments of the present invention are described in this section in detail sufficient for one skilled in the art to practice the present invention without undue experimentation. It is to be understood, however, that the fact that a limited number of preferred embodiments are described in this section does not in any way limit the scope of the present invention as set forth in the claims.

It is to be understood that whenever a range of values is described herein, i.e. whether in this section or any other part of this patent document, that the range includes the end points and every point therebetween as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention.

The current approaches to repair are typically compromises that result in an "or" type of solution instead of an "and" type of solution. Composite patches, which typically consist of epoxy reinforced with glass fibers, are the most effective choice for sealing the repair area and preventing further crack growth, but they are not field friendly and are costly. Unreinforced materials, such as polysulfide and monolithic aluminum, are effective for creating watertight repairs, but they do not prevent further crack growth under the patched area.

The present invention is directed to a low-cost, field-friendly, and non-corrosive patch approach with the structural and fatigue-resistant properties of an innovative fiber reinforced metal matrix composite material. In accordance with certain embodiments, the invention includes employing a patch containing fiber reinforced metal matrix composite (MMC) tape which would be adhesively bonded to the area effected by a defect in the aluminum structure such as cracking.

Figure 1:
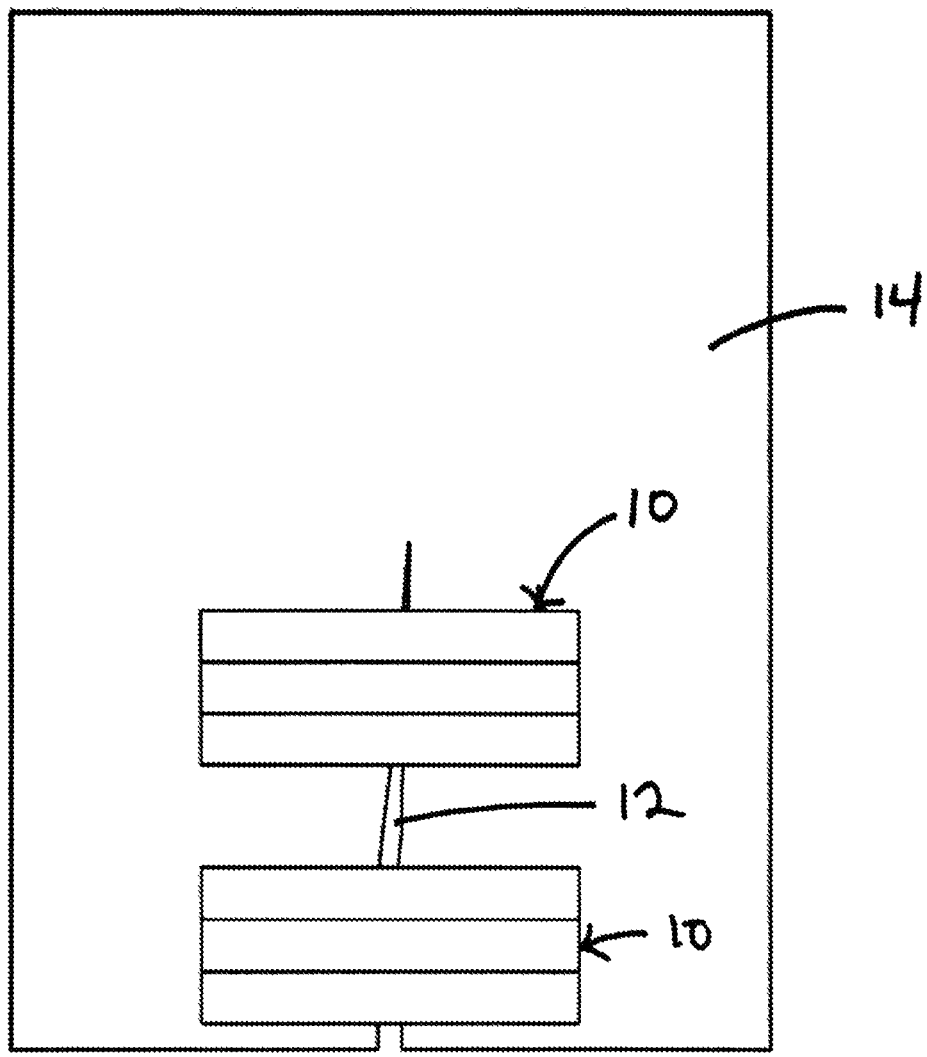
FIG. 1 is a diagrammatic view of an embodiment of the invention oriented across a crack in an aluminum structure.

With reference to FIG. 1, there is shown a plurality of MMC tapes, one such MMC tape being designated by the reference numeral 10 adhesively bonded across a crack 12 in a metal structure 14. As used herein, metal structure may include any structure made of metal or a metal alloy. In some embodiments the metal structure may be a part of a car, truck, train, boat, ship, aircraft, plane, buildings, scaffolding, computers, hand-held devices, sporting goods, or other items having a metal structure.

MMC tape 10 comprises fibers embedded in a metal matrix. Exemplary fibers, depending on the selected matrix metal, include, but are not limited to, carbon fibers, boron fibers, silicon carbide fibers, aluminum oxide fibers, glass fibers, quartz fibers, basalt fibers, ceramic fibers, metal fibers, and combinations thereof. Possible matrix metals depending on the selected fibers include, but are not limited to, aluminum, magnesium, silver, gold, platinum, copper, palladium, zinc, including alloys and combinations thereof. In certain preferred embodiments the metal matrix is aluminum, or an aluminum alloy, matrix and the fibers may include one or more fibers including, alumina ($Al_2O_3$), some other appropriate ceramic, carbon, boron, glass fibers, or combinations thereof. In certain preferred embodiments, the metal matrix composite tape includes high-strength/stiffness aluminum oxide fibers in an Aluminum 1100 matrix. The fibers embedded in the matrix are oriented substantially parallel to the length of the metal matrix composite tape.

Further the fibers are generally continuous along the length of the metal matrix composite tape, such that the length of the embedded fibers is substantially the same as the length of the metal matrix composite tape. In some embodiments shorter fibers may be used, however, the length of the fibers should be longer than the diameter of the fiber. Suitable metal matrix composite tapes include METPREG® fiber reinforced aluminum tape commercially available from Touchstone Research Laboratory. In preferred embodiments, the matrix metal of the MMC tape is similar to the metal of the metal structure.

The dimensions of the MMC tape are not particularly limited and may be selected depending on the application. The MMC tape may be cut to specific lengths or may be available as a coil in longer lengths and then cut to desired lengths. The width of the MMC tape is not particularly limited and may be selected based on the desired application. Typical ranges for the width of MMC tape may include from about 0.5 inches to 2 inches or larger. Similarly, the thickness of the MMC tape is not particularly limited. Typical thickness of MMC tape may range from about 0.010 inches to about 0.030 inches thick, and preferably about 0.015 inches thick. The cross-sectional shape of the MMC tape is not particularly limited but preferably includes relatively flat sides that may be abutted against flat sides of adjacent pieces of MMC tape. Suitable cross-sectional shapes may include regular or irregular polygons, including but not limited to, a regular triangle, an acute triangle, a right triangle, an obtuse triangle, a parallelogram, a square, a rectangle, a trapezium, a kite, a rhombus, a pentagon, a hexagon, a heptagon, an octagon, a nonagon, a decagon, or other quadrilateral. In certain embodiments, the MMC has a rectangular cross section.

The MMC tape 10 is generally oriented across the crack 12 of the structure 14. In the embodiment illustrated in FIG. 1, the MMC tape 10 is oriented such the length of the MMC tape 10 is generally perpendicular to the length of the crack 12. While the MMC tape 10 in FIG. 1 is shown as generally perpendicular to the length of the crack 12, the MMC tape may be placed at any other angle relative to the crack. The MMC tape 10 should be long enough to allow for adhesive bonding of the MMC tape to the aluminum structure on both sides of the crack. In general, the wider the crack, there should be more allowance in length of the MMC tape for bonding to the structure.

The number of MMC tapes 10 utilized is not particularly limited. In some embodiments, the at least one MMC tape should include a sufficient number of MMC tapes to completely cover the length of the crack. In other embodiments, the at least one MMC tape should include a sufficient number of MMC tapes to cover at least 75%, or at least 50%, or at least 25% of the length of the crack. When more than one MMC tape is used, they may be placed adjacent to one another, spaced apart from one another, or some combination thereof.

As mentioned above, the MMC tapes 10 are generally oriented across the crack to allow for bonding to the metal structure. The MMC tapes may be oriented generally perpendicular to the length of the crack as illustrated in FIG. 1, or they may be oriented at any angle to the length of the crack, approaching and including generally parallel to the crack, although as the angle moves closer to being parallel with the defect, the benefits of the MMC tape would be reduced.

Figure 2:
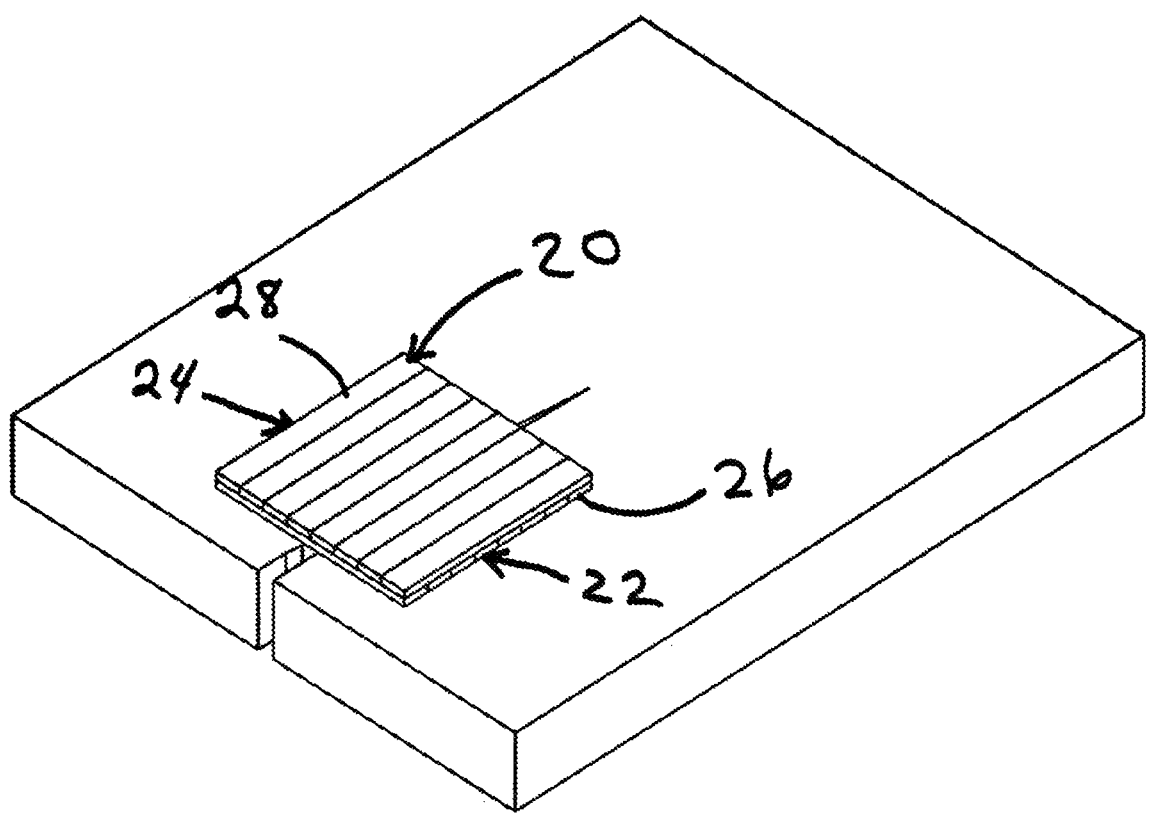
FIG. 2 is a diagrammatic view of an embodiment of the invention illustrating the second layer of fiber reinforced aluminum tape.

With reference to FIG. 2, a patch 20 may be formed by a first MMC tape layer 22 and a second MMC tape layer 24. The first MMC tape layer 22 may include two or more MMC tapes 26 placed adjacent to one another. The second MMC tape layer 24 may include at least one MMC tape 28 placed over and adhesively bonded to the first MMC tape layer 22. The orientation of the at least one MMC tape 28 in the second MMC tape layer 24 relative to the two or more MMC tapes 26 in the first MMC tape layer 22 is not particularly limited. In certain embodiments the orientation may be parallel, substantially parallel, orthogonal, substantially orthogonal, or any angle therebetween. In some embodiments, the at least one MMC tape 28 in the second MMC tape layer 24 forms an angle ranging from about 0 degrees (parallel) to about 90 degrees (orthogonal) relative to the two or more MMC tapes 26 in the first MMC tape layer 22. If desired, additional layers of MMC tape may be adhesively bonded to an adjacent layer to form a third, fourth, or fifth layer and so on until the desired number of layers are reached. Each of the layers may be oriented at a desired angle relative to the previous layer as described above.

In some embodiments the cross-sectional shapes for the MMC tapes within the layer may be the same or they may be different depending upon the desired application or need. Further the cross-sectional shapes for the MMC tapes may be different from one layer to the next.

The adhesive used to bond the MMC tape to the metal structure should exhibit sufficient bond strength between the metal structure and the MMC tape such that MMC tape will remain adhesively bonded to the aluminum structure during typical use of the aluminum structure. In some embodiments the adhesive may include, but is not limited to, methacrylate adhesives.

In practice, an adhesive is applied to either the metal structure in the area where the MMC tape or patch is to be applied or the adhesive may be applied directly to the MMC tape or patch. The MMC tape or patch is positioned and adhesively bonded across the crack and over the area to be reinforced. In some embodiments, a patch may be assembled and then applied and adhesively bonded to the structure. In other embodiments, the patch may be constructed directly on the structure. After one layer of MMC tape is adhesively bonded to the desired area of the structure, additional layers of MMC tape may be applied to and adhesively bonded to previous MMC tape layers in the desired orientation. In this way, a patch may be constructed during application of the MMC tape.

In some embodiments, MMC tape or a patch is adhesively bonded to one side of the structure across the crack. In other embodiments, it may be desirable to apply a second MMC tape or second patch on the opposing side of the structure.

The MMC tape allows for different layup options to be employed allowing the patching system to be adapted to most cracking scenarios. This approach represents an affordable way to selectively reinforce metallic structures and allows for flexibility when applying the patch on cracked surfaces. Typically employing the MMC tape or patch on both sides of the structure yields the most effective results, but there is still a noticeable increase in fatigue life when the MMC tape or patch is applied to just one side of the structure. The application of the MMC tape not only increases the fatigue life of the structure it is bonded to, but it may also result in a more graceful failure mode that minimizes collateral damage to the surrounding structures.

While several embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

What is claimed is:

1. A method for repairing a crack in a metal structure, the method comprising:

adhesively bonding a second fiber reinforced metal matrix composite tape layer to a first fiber reinforced metal matrix composite tape layer to form a patch, wherein the first fiber reinforced metal matrix composite tape layer comprises two or more fiber reinforced metal matrix composite tapes positioned adjacent to one another, wherein the two or more fiber reinforced metal matrix composite tapes comprise generally continuous fibers embedded in a metal matrix along the length of the tape, and wherein the second fiber reinforced metal matrix composite tape layer is positioned at an angle relative to the first fiber reinforced metal matrix composite tape layer;

positioning the patch over a crack in a metal structure such that at least one of the first fiber reinforced metal matrix composite tape layer and the second fiber reinforced metal matrix composite tape layer is oriented at an angle relative to the length of the crack; and bonding the patch across the crack in the metal structure.

2. The method of claim 1 wherein the patch covers at least 25% of the crack.

3. The method of claim 1, further comprising adhesively applying a second patch comprising at least one fiber reinforced metal matrix composite tape across the crack on an opposing side of the metal structure.

\* \* \* \* \*